United States Patent [19]
Day

[11] Patent Number: 5,866,080
[45] Date of Patent: Feb. 2, 1999

[54] RECTANGULAR-CHANNEL CATALYTIC CONVERTERS

[75] Inventor: J. Paul Day, Big Flats, N.Y.

[73] Assignee: Corning Incorporated, Corning, N.Y.

[21] Appl. No.: 889,957

[22] Filed: Jul. 10, 1997

Related U.S. Application Data

[60] Provisional application No. 60/023,788 Aug. 12, 1996.

[51] Int. Cl.⁶ .................................................. B01D 53/34
[52] U.S. Cl. ......................... 422/180; 422/177; 428/116; 55/523
[58] Field of Search .................................... 422/177, 180, 422/211, 222, 174, 179; 428/116, 593–594; 502/527.21, 439; 55/DIG. 30, 523

[56] References Cited

U.S. PATENT DOCUMENTS

| | | | |
|---|---|---|---|
| 3,790,654 | 2/1974 | Bagley | 264/177.11 |
| 3,885,977 | 5/1975 | Lachman et al. | 428/116 |
| 4,127,691 | 11/1978 | Frost | 428/116 |
| 4,731,010 | 3/1988 | Cunningham | 264/177.11 |
| 5,628,975 | 5/1997 | Horiuchi et al. | 423/213.2 |

FOREIGN PATENT DOCUMENTS

| | | |
|---|---|---|
| 0 140 601 | 5/1985 | European Pat. Off. . |
| 0 289 817 | 11/1988 | European Pat. Off. . |
| 7204500 | 8/1995 | Japan . |

*Primary Examiner*—Hein Tran
*Attorney, Agent, or Firm*—Kees van der Sterre

[57] ABSTRACT

Extruded rectangular-channel ceramic honeycombs wherein the channels have a rectangular cross-section of aspect ratio 1.2:1 or greater and a hydraulic diameter $D_h$ and constant temperature Nusselt Number $N_\mu$ ("shape" heat transfer characteristic) yielding an "effective" channel surface area factor $N_\mu/D_h$ of at least about 70, provide catalytic substrates for engine exhaust emissions control offering better light-off performance, enhanced conversion efficiency at current converter pressure drops, and/or equivalent efficiency at reduced pressure drops.

4 Claims, 2 Drawing Sheets

RECTANGULAR-CHANNEL CATALYTIC CONVERTERS

This application claims the benefit of U.S. Provisional Application No. 60/023,788, filed Aug. 12, 1996, entitled RECTANGULAR-CELL CATALYTIC CONVERTER, by J. Paul Day.

BACKGROUND OF THE INVENTION

The present invention is in the field of emissions control and relates more particularly to improved catalytic converters for the abatement of carbon monoxide, nitrogen oxides, and unburned hydrocarbons generated by internal combustion engines such as used in stationary and mobile applications, e.g., in automobiles.

At present, the majority of catalytic converters for automotive engine emissions abatement applications comprise one or more platinum group metal catalysts dispersed on a refractory high-surface-area coating, the coating and catalyst being supported within the channels or "cells" of a ceramic honeycomb support through which the engine exhaust stream is passed. Ceramic honeycomb supports useful for this application, conventionally comprising an inlet face, an outlet face, and a plurality of parallel open-ended channels or cells traversing the support between the inlet and outlet faces, the channels being defined by interconnecting, criss-crossing cell walls, are described in U.S. Pat. No. 3,885,977. Methods and apparatus for the production of such supports by ceramic powder extrusion processes are disclosed in U.S. Pat. Nos. 3,790,654 and 4,731,010.

Past theoretical work in the area of extruded cellular ceramic supports has concentrated on pressure drop and conversion efficiency. Conventionally, conversion efficiencies have been considered to be directly related to the geometrically calculated surface areas of the cellular supports, i.e., to the total of all of the surface areas of all of the walls forming the channels of the cellular (honeycomb) supports. Thus designers in this field have customarily based predictions of the catalytic performance of each commercial square-celled extruded product largely on the calculated geometric surface area of the support. As data have accumulated, however, discrepancies between the calculated surface areas and measured catalytic performances have raised doubts about the exact relationship between these two parameters.

A particular example of such a discrepancy is illustrated by performance comparisons between a 400-cell extruded ceramic honeycomb (i.e., a honeycomb having a cell density of 400 cells per square inch of honeycomb inlet surface area) and a 400-cell wrapped metal honeycomb. The geometric surface area of the metal honeycomb is approximately 33% higher than that of the ceramic honeycomb, due largely to the sinusoidal shape of the cells or channels in the metal honeycomb. However, in tests of the emissions performance of the two products, conducted at the same substrate volume (i.e., with the metal honeycomb maintaining a surface area advantage of 33%), the performance of the two products is found to be virtually identical.

Past approaches to improve the performance of catalytic converters by increasing honeycomb geometric surface area have a number of disadvantages. First, significant surface area increases require increases in cell density. Such increases tend to reduce the cell hydraulic diameters and increase gas pressure drops across the converters, even though some reductions in cell wall thickness to reduce converter pressure drop can be made. Reductions in cell wall thickness, however, are limited by product strength requirements and other considerations, including increased difficulty of manufacture which can greatly increase the cost of the products.

These and other concerns suggest that a deeper understanding of the material and/or geometric factors affecting emissions performance will be required if significant improvements in the performance of honeycomb catalytic converters for gas treatment applications are to be secured.

It is therefore a principal object of the present invention to provide catalytic converters of improved performance, by specifying the design parameters of the honeycomb substrate in light of a further analysis of the factors governing converter performance.

Other objects and advantages of the invention will become apparent from the following description thereof.

SUMMARY OF THE INVENTION

The present invention provides extruded ceramic honeycombs offering emissions abatement performance superior to the performance of prior art honeycombs in terms of conversion efficiency and improved heat-up and light-off characteristics. In particular, the invention provides honeycombs of rectangular channel cross-section which, if properly designed as to channel size, channel aspect ratio, cell wall thickness and cell density (channel count per unit of honeycomb frontal area), can provide accelerated catalyst light-off and significantly improved emissions control performance when compared to existing commercial products. The improvements in emissions control performance are manifested by increased catalytic conversion efficiencies, reduced exhaust gas pressure drop from the converter, or a combination of both.

Honeycombs provided according to the invention will have a rectangular channel cross-section characterized by an aspect ratio (long side:short side) greater than 1.2:1. In addition, the hydraulic diameter $D_h$ of the channels, and the "shape" heat transfer characteristic $N_\mu$ of the channel, which is the constant-temperature Nusselt Number for the channel cross-section, will be selected to provide a $N_\mu/D_h$ ratio that is preferably 70 or greater. While providing enhanced light-off characteristics, the honeycombs will maintain both the necessary geometric surface area for effective catalytic treatment and adequate fluid flow to meet the pressure drop requirements of current emissions control systems.

Honeycombs meeting these requirements will generally have cell densities in the range of about 350–600 rectangular cells/in$^2$ and cell wall thicknesses in the range of 0.002–0.006 inches. The channel cross-sections of the honeycombs will desirably have aspect ratios in the 1.5–2.5 range.

Within the design region defined by these parameters, honeycombs exhibiting significantly enhanced conversion efficiencies at presently accepted levels of converter pressure drop can be designed. Alternatively, present conversion efficiencies can be maintained while securing significant reductions in both converter volume and converter flow resistance. In both of these cases, the improved heat transfer characteristics of the honeycombs are expected to provide a substantial improvement in the light-off performance of the converters.

DESCRIPTION OF THE DRAWINGS

The invention may be further understood by reference to the drawings, wherein.

DETAILED DESCRIPTION

Figure 3:
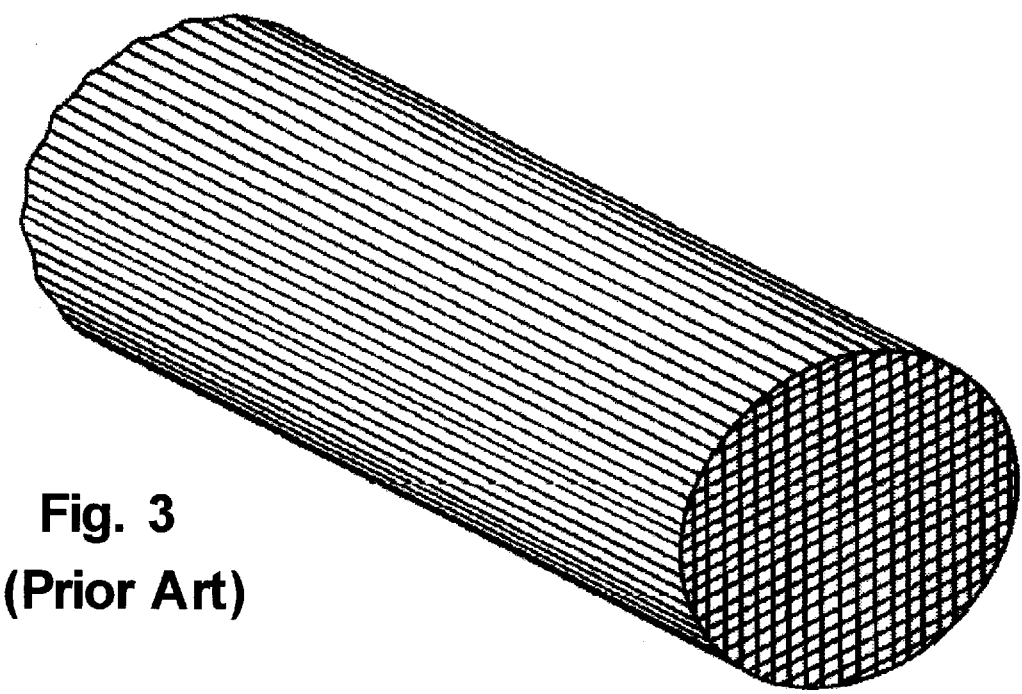
FIG. 3 illustrates a prior art cermic honeycomb support.

Conventionally structured ceramic honeycomb supports for catalytic converters comprise an inlet face, an outlet face, and a plurality of parallel open-ended channels or cells traversing the support between the inlet and outlet faces, the channels being defined by interconnecting, criss-crossing cell walls. FIG. 3 illustrates this conventional structure.

The present invention involves an application of principles of fluid dynamics and heat transfer to problems of honeycomb catalytic converter design. A key working assumption is that those parameters of honeycomb design influencing heat exchange (surface area, channel shape, and cell size) will also influence catalytic performance, since in both cases gas molecules must be drawn to the cell walls of the honeycomb before the desired wall interaction will occur.

Based on studies of convective heat transfer from a fluid such as an exhaust gas stream to a honeycomb cell wall, an equation relating heat transfer (the product of the geometric surface area (A) of the honeycomb and the convective heat transfer coefficient (h)) to the size and shape of the honeycomb channels can be derived as follows:

$$h \cdot A = \frac{N_u \cdot A}{D_h} \cdot k = H \cdot k \quad (1)$$

In Equation (1), h is the convective heat transfer coefficient, A is the geometric surface area, $N_\mu$ is the constant temperature Nusselt Number associated with channel shape, $D_h$ is the channel hydraulic diameter, and k is the thermal conductivity of the fluid. The quantity H defines a heat transfer factor, independent of properties of the fluid and depending only on the size, shape, and extent of the channels of a honeycomb, which can be used to gauge the effects of geometry alone on heat transfer. When applied to the problem of predicting relative catalytic effectiveness, Equation (1) suggests that such effectiveness should depend not on honeycomb geometric surface area A alone, but rather on an "effective" geometric surface area corresponding to the actual surface area A times the "effective" surface area factor $N_\mu/D_h$.

Validation of this heat transfer model for predicting catalytic activity can be found in data reflecting the difference in actual conversion efficiency between a square-channeled ceramic honeycomb converter incorporating straight cell walls and a wrapped metal honeycomb converter incorporating sinusoidal cell walls. Literature sources report a geometric surface area A of about 2.7 m²/liter for a standard 400-cell/in² ceramic honeycomb support and about 3.6 m²/liter for a 400-cell/in² wrapped metal honeycomb. The surface area ratio is 75%. The channel geometry coefficients $N_\mu/D_h$ for the ceramic and wrapped metal honeycombs are 76 and 58, respectively, yielding a coefficient ratio of 131%.

The product of the two ratios, which should represent the ratio of the "effective" surface areas of these two honeycombs, is 98.3%. Thus the heat transfer model predicts approximately equivalent catalytic efficiencies for the two different honeycomb structures, a prediction that has been confirmed by catalytic performance tests for honeycombs of these two quite different designs.

Further evidence of validity of the heat transfer model lies in the experimental observation that a 350-cell ceramic honeycomb product having approximately the same geometric surface area as the 400-cell honeycomb, but with thinner cell walls for reduced honeycomb pressure drop, exhibits slightly lower catalytic conversion efficiency. Although the Nusselt Numbers ($N_\mu$) and geometric surface areas (A) of the two honeycombs are the same, the hydraulic diameter ($D_h$) of the channels in the 350-cell product is somewhat larger. Following the above analysis, it is this increase in $D_h$ that slightly reduces the "effective" surface area and hence the catalytic performance of the 350-cell converter.

Applying these principles to the problem of honeycomb design involves ascertaining the Nusselt Numbers $N_\mu$ and evaluating the geometric surface areas and channel hydraulic diameters of competing honeycomb configurations. Both constant wall temperature (T) and constant heat flux (H) Nusselt Numbers for a variety of regular polygonal shapes are known or can be calculated. Constant heat flux Nusselt Number values for three common channel shapes that can fill a honeycomb cross-section without voids, i.e., equilateral triangles, squares, and hexagons, are 3.00, 3.63, and 4.00, respectively. A fourth common space-filling shape, the rectangle, has a Nusselt Number that depends on the aspect ratio n of the rectangle. Table I below sets forth constant heat flux $N_\mu(H)$ and constant temperature $N_\mu(T)$ Nusselt Number values for the square (n=1) and several representative rectangles of increasing aspect ratio.

TABLE I

Nusselt Numbers for Rectangles

| Aspect Ratio (n) | $N_\mu(H)$ | $N_\mu(T)$ |
|---|---|---|
| 1 (square) | 3.63 | 2.89 |
| 1.5 | 3.79 | 3.12 |
| 2.0 | 4.11 | 3.38 |
| 2.5 | 4.46 | 3.67 |

Figure 1:
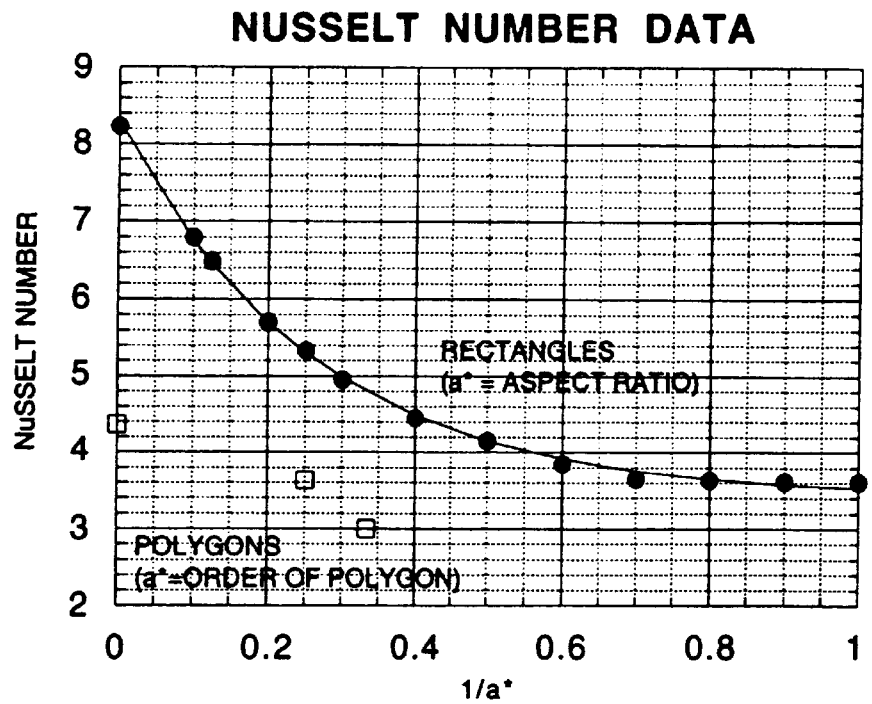
FIG. 1 plots the Nusselt Number at constant heat rate for rectangular channel shapes over a range of different aspect ratios.

FIG. 1 of the drawing plots constant heat flux Nusselt numbers for various polygons, including various rectangles over a range of aspect ratios from an aspect ratio of 1 (square) to aspect ratios above 5. Nusselt numbers in the range of about 3.7–4.5 are most typical of the rectangular channel configurations useful in the honeycomb designs of the invention.

From Equation (1) above, the heat transfer factor H corresponding to the "effective" surface area of a honeycomb shape is the product of the Nusselt Number and the ratio of the geometric surface area A to the channel hydraulic diameter $D_h$. For rectangular channel shapes, this ratio depends in part on the aspect ratio n of the rectangular channels, as follows:

$$\frac{A}{D_h} = \frac{2Nb(n+1)}{2nb/(n+1)} = N \frac{(n+1)^2}{n} \quad (2)$$

where N is the cell density, n is the aspect ratio of the rectangle, and b is the open length of the short side of the rectangular channel cross-section. Using this relationship, a heat transfer factor H can be calculated for various rectangular channel shapes to be considered for a honeycomb design. Further, the effects of changes in channel aspect ratio alone, i.e., the performance of various channel shapes at constant cell density N, can be compared and assessed.

Figure 2:
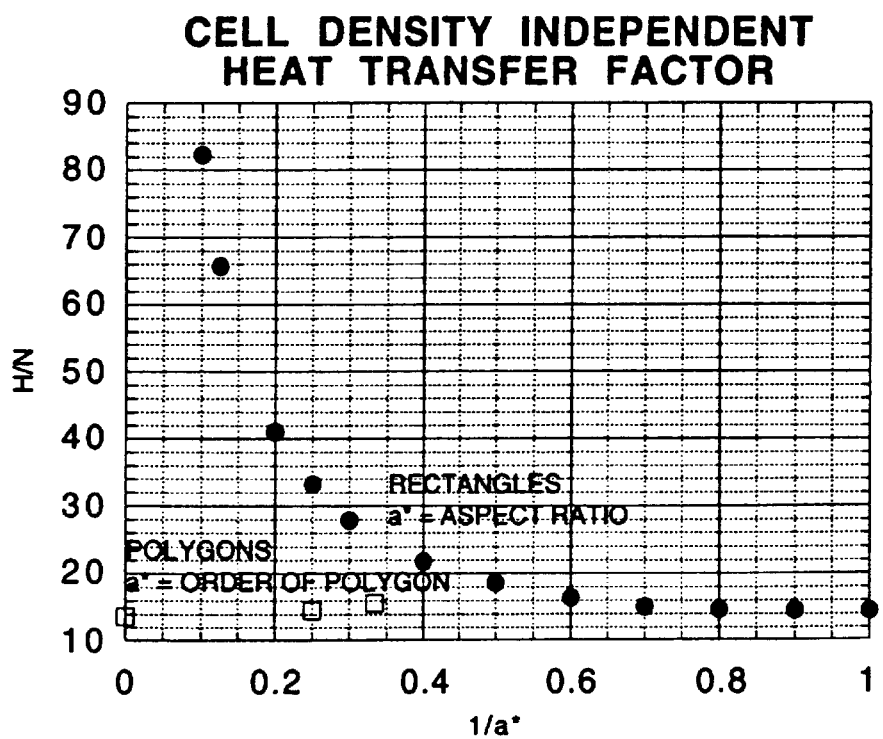
FIG. 2 plots a cell-density independent heat transfer factor H/N for rectangular channel shapes over a range of different aspect ratios.

FIG. 2 of the drawing plots heat transfer factors for various channel shapes as the cell-density-independent heat transfer ratio H/N. These factors are plotted for the same polygons as graphed in FIG. 1, including a number of rectangles over a relatively broad range of aspect ratios. It is evident from these data that very high heat transfer factors can theoretically be attained, although practical considerations will limit this factor as hereinafter more fully described.

From these kinds of analyses it may be calculated that a rectangle with an aspect ratio of 2:1 would have a 29% higher heat transfer and a 29% higher effective surface area than a square of the same cell density. Likewise, 2.5:1 aspect ratio would result in a 50% higher value of each quantity. Note that, according to the above analysis, the heat transfer factor is independent of the thickness of the cell wall.

While heat transfer considerations alone suggest that the highest possible aspect ratios for the channel shapes should be considered, limitations arising out of engine operating requirements impose practical limits on the aspect ratios which can be used. More particularly, the requirement to maintain both converter pressure drop and converter size below specified design levels inherently restricts the maximum aspect ratios that can be used.

In addition to the limits on increased aspect ratio imposed by gas pressure drop and converter size requirements, the practical limitations on honeycomb strength resulting from changes in channel shape must be considered. For example, at present, ceramic honeycombs are produced by the extrusion of plasticized mineral powder batches, and the plasticity of these batches is such that, in the undried or "wet" state the honeycombs are subject to cell deformation under slight stress. Increasing the aspect ratio of the channels of these honeycombs increases the susceptibility of the structure to cell deformation, thus very high-aspect-ratio products may require special extrusion and/or "wet" handling techniques, and may therefore have higher manufacturing costs. For these reasons, as well as for pressure drop considerations, channel aspect ratios below about 2.5 are presently preferred.

A further understanding of the effects of channel cross-sectional shape on the performance of honeycomb supports can be gained by studying the effects of changing design parameters on the calculated conversion efficiency and flow resistance of specific representative honeycomb designs. For the purposes of such a study a honeycomb support structure having a channel aspect ratio of 2:1, a cell density of 400 cells/in$^2$, and a cell wall thickness of 0.005 in. was compared with a standard commercial honeycomb support of the same cell density, but with a square channel cross-section and a cell wall thickness of 0.007 in. Other honeycomb designs studied included a typical high-cell-density honeycomb of square channel cross-section, in this case a honeycomb with 600 square cells/in$^2$ having cell walls of 0.004 in thickness.

One mode of use of the 400-rectangular-cell product would be in direct substitution for the standard square-channel product on a volume-for-volume basis. Compared to the standard product, the "effective" surface area of a 400-rectangular-cell product having the same converter volume is increased by more than 30%. This increased surface area translates into an increase in heat transfer, and thus light-off and/or conversion efficiency, the magnitude of the increases being approximately the same as the increase in "effective" surface area.

At the same time, due to the change in cell wall thickness and channel hydraulic diameter, the pressure drop of the rectangular-channel honeycomb at the same converter volume is slightly reduced, i.e., to a value of 98% of the standard converter at equivalent converter volume. With respect to converter pressure drop it should be noted that, while a similar increase in "effective" surface area could be achieved with more conventional square-channel designs such as the high-cell-density 600-cell honeycomb above described, the 600-cell design incurs a gas pressure drop penalty in excess of 20% over that of the standard converter, an increase which is not acceptable in current exhaust systems.

An alternative mode of use of the rectangular-channel honeycomb support would be in an exhaust system maintaining the same pressure drop level as a system employing a standard converter. In that application, due to the somewhat reduced pressure drop exhibited by the rectangular-channel product, a larger converter volume could be employed. The "effective" surface area and thus conversion efficiency of the rectangular-channel converter in that exhaust system design would increase by approximately 40% over that of the standard converter.

Yet another mode of use of the described rectangular-channel converter would be in an exhaust system designed to simply maintain performance at levels achieved with a standard converter. The advantage of the rectangular-channel honeycomb in such a system would be reduced converter size and improved engine operation due to reduced converter pressure drop.

Using the 400-rectangular-cell converter to achieve constant conversion efficiency requires only 76% of the converter volume and generates only 73% of the gas pressure drop of the standard square-channel converter. Similar volume reductions may be achieved with high-cell-density square-channel converter designs, such as the 600-cell honeycomb above described, but the pressure drop reductions obtainable with the rectangular-channel honeycomb are almost twice as large as those obtained with the 600-square-cell product.

The use of a rectangular channel design to replace conventional square-channel honeycombs is also expected to result in improved catalytic converter light-off characteristics. The two support-related factors most important to light-off performance are the thermal mass of the catalyst carrier (the combination of the support and the washcoat), and the rate at which heat is transferred to the catalyst.

In the prior art, the favored approach to obtain faster catalyst light-off has been to decrease the thickness of the honeycomb walls, in order to reduce the heat capacity of the substrate. The rectangular channel catalyst support enhances light-off in at least two other ways. First the catalytic activity of the system is higher due to the higher "effective" surface area of the support. Secondly, the rate at which heat is absorbed by the support at the beginning of the test cycle is increased. While the magnitude of the improvement in catalyst light-off attributable to the rectangular channel design has not yet been established, the higher surface area and faster heat absorption of these substrates should further enhance light-off advantages derived from reduced wall thickness alone.

As previously noted, considerations relating to honeycomb stiffness and/or strength, both during manufacturing and during the subsequent canning of the ceramic honeycomb structures impose limits on the rectangular geometries which may be employed. Specifically, to insure that the honeycomb will withstand the stresses encountered in canning, a proper relationship between cell wall thickness and long cell wall length for the rectangular channels must be maintained. Considering the strength requirements established through experience with conventional square-channeled honeycombs, the following relationship should be observed:

$$\left(\frac{t}{a}\right)^2 \geq 0.004$$

wherein t is the thickness and a is length of the long cell wall of the rectangular channels. Tables 2 and 3 below set forth honeycomb designs based on cell densities of 400 cells/in² (Table 2) and 600 cells/in² (Table 3), both for square channel (prior art) honeycomb configurations and rectangular channel honeycombs meeting the requirements of the invention. All of the rectangular channel designs have aspect ratios above 1.2 and "effective" surface area factors above 70. In addition, the rectangular channel designs incorporate cell wall thicknesses adequate to meet minimum strength requirements for the channel shapes and dimensions employed.

TABLE 2

400 Cell Honeycomb Designs

| Aspect Ratio | Wall Thickness (t, mils) | t/a | t/b | OFA | $\frac{N_\mu}{f \cdot Re}$ | $\frac{N_\mu \cdot OFA^2}{f \cdot Re}$ | Mass |
|---|---|---|---|---|---|---|---|
| Rectangular-Cell Honeycombs | | | | | | | |
| 1.25 | 3.6 | 0.064 | 0.080 | 0.870 | 0.254 | 0.192 | 0.130 |
| 1.67 | 4.1 | 0.064 | 0.106 | 0.850 | 0.259 | 0.187 | 0.150 |
| 2.00 | 4.5 | 0.064 | 0.127 | 0.834 | 0.264 | 0.184 | 0.166 |
| 2.00 | 5.0 | 0.071 | 0.141 | 0.819 | 0.264 | 0.177 | 0.181 |
| 2.50 | 5.1 | 0.064 | 0.161 | 0.808 | 0.272 | 0.178 | 0.192 |
| Square-Cell Honeycombs (Prior Art) | | | | | | | |
| 1.00 | 7.0 | 0.14 | 0.14 | 0.740 | 0.253 | 0.139 | 0.260 |
| 1.00 | 6.0 | 0.12 | 0.12 | 0.774 | 0.253 | 0.152 | 0.226 |
| 1.00 | 5.0 | 0.10 | 0.10 | 0.810 | 0.253 | 0.166 | 0.190 |
| 1.00 | 4.0 | 0.08 | 0.08 | 0.846 | 0.253 | 0.181 | 0.154 |
| 1.00 | 3.2 | 0.064 | 0.064 | 0.876 | 0.253 | 0.194 | 0.124 |

TABLE 3

600 Cell Honeycomb Designs

| Aspect Ratio | Wall Thickness (t, mils) | t/a | t/b | OFA | $\frac{N_\mu}{f \cdot Re}$ | $\frac{N_\mu \cdot OFA^2}{f \cdot Re}$ | Mass |
|---|---|---|---|---|---|---|---|
| Rectangular-Cell Honeycombs | | | | | | | |
| 1.25 | 2.9 | 0.064 | 0.079 | 0.872 | 0.254 | 0.193 | 0.128 |
| 1.67 | 3.4 | 0.064 | 0.108 | 0.848 | 0.259 | 0.186 | 0.152 |
| 2.00 | 3.7 | 0.064 | 0.128 | 0.833 | 0.264 | 0.183 | 0.167 |
| 2.00. | 4.0 | 0.069 | 0.139 | 0.821 | 0.264 | 0.178 | 0.179 |
| 2.50 | 4.1 | 0.064 | 0.159 | 0.811 | 0.272 | 0.179 | 0.189 |
| Square-Cell Honeycombs (Prior Art) | | | | | | | |
| 1.00 | 6.0 | 0.147 | 0.147 | 0.728 | 0.253 | 0.134 | 0.272 |
| 1.00 | 5.0 | 0.122 | 0.122 | 0.770 | 0.253 | 0.150 | 0.230 |
| 1.00 | 4.0 | 0.098 | 0.098 | 0.814 | 0.253 | 0.168 | 0.186 |
| 1.00 | 3.0 | 0.073 | 0.073 | 0.858 | 0.253 | 0.186 | 0.142 |
| 1.00 | 2.6 | 0.064 | 0.064 | 0.876 | 0.253 | 0.194 | 0.124 |

Referring more particularly to data reported in the Tables, each of the reported designs includes the calculated ratio of wall thickness to long cell wall length (t/a) and to short cell wall length (t/b), the open frontal area (OFA) of the honeycomb, and two performance-related parameters indicative of projected honeycomb performance. These latter parameters are calculated from the constant heat flux Nusselt Numbers ($N_\mu$), open frontal areas, channel dimensions and honeycomb pressure drop characteristics (f·Re) of each honeycomb.

Of particular relevance to exhaust system design are coefficients such as $N_\mu \cdot OFA^2/f \cdot Re$, this being a measure of the heat transfer per unit of pressure drop across a honeycomb converter for a particular honeycomb design. As the tabulated data in Tables 2 and 3 suggest, at a given gas pressure drop, the rectangular channel designs of the invention show better heat-up performance than square-channel designs of equivalent cell density and cell wall thickness. The attainment of similar performance levels in square-channel designs requires substantial wall thickness reductions, the honeycombs therefore being more difficult to manufacture and more susceptible to physical damage during assembly or in use.

Maintaining the performance advantages of rectangular channel honeycomb designs requires careful adherence to the design limits hereinabove set forth. Lower channel aspect ratios than required will sacrifice the performance advantages of the honeycombs, while at aspect ratios higher than about 2.5, the cell wall thicknesses required for adequate honeycomb durability become excessive. When the "effective" surface area factor $N^\mu/D_h$ falls below about 70, the heat transfer advantages of the rectangular channel shape are substantially lost; on the other hand designs with very high $N_\mu/D_h$ factors (higher than about 120) typically present unacceptably high gas pressure drop per unit of honeycomb surface area unless the cell walls are extremely thin. Honeycomb designs within the cell density limits of about 350–600 rectangular cells/in², and with wall thicknesses in the range of about 0.002–0.006 inches can generally meet these requirements, while at cell densities outside this range, the required $N_\mu/D_h$ factors cannot be effectively maintained at cell wall thicknesses that are practical from a manufacturing or use standpoint.

I claim:

1. An extruded ceramic honeycomb body having an inlet face, an outlet face, and a plurality of parallel, open-ended channels formed by intersecting cell walls traversing the body from the inlet face to the outlet face thereof, wherein:
   the channels have a cross-section of rectangular shape with a rectangle aspect ratio of at least about 1.2:1,
   the channels have a hydraulic diameter $D_h$ and a constant temperature Nusselt Number $N_\mu$ providing an effective surface area factor $N_\mu/D_h$ of at least about 70 for the honeycomb body; and
   the honeycomb body has a cell density in the range of about 350–600 rectangular cells/in² and the intersecting cell walls have a wall thickness (t) in the range of about 0.002–0.006 inches.

2. A honeycomb body in accordance with claim 1 wherein the rectangle aspect ratio is in the range of about 1.5–2.5.

3. A honeycomb body in accordance with claim 1 having a long wall length (a), corresponding to the length of the longer side of the rectangular channels, which bears a relationship to the wall thickness (t) satisfying the expression:

$$\left(\frac{t}{a}\right)^2 \geq 0.004.$$

4. In a catalytic converter for treating combustion engine exhaust gases which includes a ceramic honeycomb catalyst support body comprising a plurality of parallel open-ended channels or cells traversing the body from one end to another, the channels being defined by interconnecting, criss-crossing cell walls, the improvement wherein:

the channels have a cross-section of rectangular shape with a rectangle aspect ratio in the range of about 1.5–2.5;

the channels have a hydraulic diameter $D_h$ and a constant temperature Nusselt Number $N_\mu$ providing an effective surface area factor $N_\mu/D_h$ of at least about 70 for the honeycomb body;

the honeycomb body has a cell density in the range of about 350–600 rectangular cells/in² and the intersecting cell walls have a wall thickness (t) in the range of about 0.002–0.006 inches; and the cell walls have a long wall length (a), corresponding to the length of the longer side of the rectangular channels, which has a relationship to the wall thickness (t) satisfying the expression:

$$\left(\frac{t}{a}\right)^2 \geq 0.004.$$

* * * * *